United States Patent
Kildea et al.

(10) Patent No.: US 6,302,651 B1
(45) Date of Patent: Oct. 16, 2001

(54) BLADE ATTACHMENT CONFIGURATION

(75) Inventors: Robert J. Kildea, North Palm Beach; Wayne D. Wekenmann, Jupiter, both of FL (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/474,355

(22) Filed: Dec. 29, 1999

(51) Int. Cl.[7] .................................................. B63H 1/20
(52) U.S. Cl. ............................................. 416/219 R
(58) Field of Search .................................. 416/219 R

(56) References Cited

U.S. PATENT DOCUMENTS

| | | | |
|---|---|---|---|
| 4,692,976 | * 9/1987 | Andrews | 416/219 R |
| 4,824,328 | * 4/1989 | Pisz et al. | 416/219 R |
| 5,147,180 | * 9/1992 | Johnson | 416/219 R |
| 5,176,500 | * 1/1993 | Heinig | 416/219 R |
| 5,593,282 | * 1/1997 | Krueger | 416/219 R |

* cited by examiner

Primary Examiner—John Kwon
(74) Attorney, Agent, or Firm—Norman Friedland

(57) ABSTRACT

The blade firtree bearing surface and/or the disk broached slot bearing surface is "crowned" to reduce the stresses at the edges thereof and more uniformly distribute the load. The width of the bearing surface is increased over the conventional flat bearing surface of the blade firtree and/or the bearing surfaces of the disk broach by judiciously moving the contact point to a discrete location.

16 Claims, 4 Drawing Sheets

BLADE ATTACHMENT CONFIGURATION

This invention was made with Government funds and the United States Government obtains rights herein.

TECHNICAL FIELD

This invention relates to blades for rotors in a gas turbine engine and particularly to the firtree configuration of the blade that is attached to the disk of the rotor in the broach slot formed in the rim of the disk.

BACKGROUND OF THE INVENTION

As is well known in the gas turbine engine technology, the advancement of high performance aircraft has imposed heavier loads on the turbine and compressor rotors. Thus, it is incumbent on the design of the component parts of these rotors that the stresses do not impair the structural integrity of the rotor and the rotor components. One of the problems that have been evidenced in the firtree attachments for blades is that the attachments have flat surfaces on the bearing surfaces at the interface of the blade and its broach slot in the disk of the rotor. Since the surface is flat the angle at the bearing surface is the same nominal angle through the bearing surface when the interface attempts to make full contact at all levels of loadings on the rotor. The consequence of imposing a heavy load on this flat surface is that this produces high bearing and shear stresses at the edges of the bearing surface. These high edge loadings increase the concentrated stress in the fillets that are either on the blade or on the disk adjacent to the bearing surface which can adversely affect the longevity of these components.

In addition to these problems noted in the immediately above paragraph, because each bearing surface has its own tolerance, stresses at one edge of the bearing area may be much higher or lower than at the other edge which causes more scatter and again is life limiting. To compensate for these abnormalities, the designer of the attachment must design the hardware so that the allowable stress is reduced in order to achieve the maximum design life. Obviously, in order to attain the allowable stress and reduce the design allowable stresses, the attachment weight is increased. As one skilled in this art appreciates, the weight of the components of the engine adversely affect the weight to thrust ratio with a consequential deficit in engine performance.

We have found that we can obviate this problem and enhance attachment life of the blade firtree and/or disk broach slot. In accordance with this invention selective bearing surfaces at critical locations is judiciously designed with a discrete convex or "crowned" bearing surface.

SUMMARY OF THE INVENTION

An object of this invention is to enhance the attachment of the blade to the disk of a rotor in a firtree attachment.

A feature of this invention is to configure the bearing surface of the attachment in a blade firtree and broach slotted disk to reduce stresses in the attachment.

Another feature of this invention is the provision of contouring either the bearing surface of the disk slot or the bearing surface of the blade firtree to enhance the life of the rotor. By contouring either the disk broach and/or blade firtree the weight of the attachment is lowered and the engine performance is increased.

Another feature of this invention is the judicious selection of bearing surfaces contoured in either the disk broach and/or blade firtree to benefit the overall life of the rotor and the method for making the same. This invention is particularly efficacious for a turbine rotor in a gas turbine engine for powering aircraft.

The foregoing and other features of the present invention will become more apparent from the following description and accompanying drawings.

DETAILED DESCRIPTION OF THE INVENTION

While this invention is being shown in its preferred embodiment of the attachment of a firtree blade mounted in the broached slot of the rim of a disk of a turbine rotor adapted for use for a gas turbine engine powering aircraft, it is to be understood and as one skilled in this art will appreciate that this invention has utility to other firtree attachments. In addition, while the preferred embodiment illustrates one of the many bearing surfaces that are in one of the blade's firtree attachments, it is to be understood that the invention contemplates utilizing these teachings to all of the bearing surfaces or selective bearing surfaces so as to tailor the stresses occasioned throughout the blade and disk of the rotor so as to obtain the optimized weight and life of the rotor. Obviously, the bearing surfaces described hereinbelow would be symmetrical about the center line of the firtree and/or broach slot.

Figure 1:
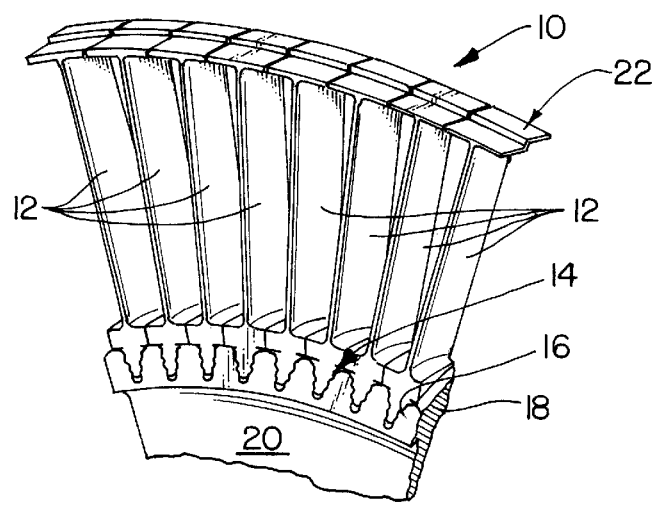
FIG. 1 is a partial view in perspective illustrating a prior art turbine rotor with a blade firtree and complementary broach slot in the rim of the disk.

Referring to the partial view of the prior art turbine rotor in FIG. 1, the turbine rotor is generally illustrated by reference numeral 10 having a plurality of circumferentially spaced turbine blades 12 attached by the firtree attachment generally illustrated by reference numeral 14. The attachment includes the firtree configuration 15 at the root of the blade 12 and the broached slot 16 in the rim 18 of the turbine disk 20. While this prior art blade includes a tip shroud 22, this invention is also applicable to turbine rotors that do not include a shroud or may include a part span shroud.

Figure 2:
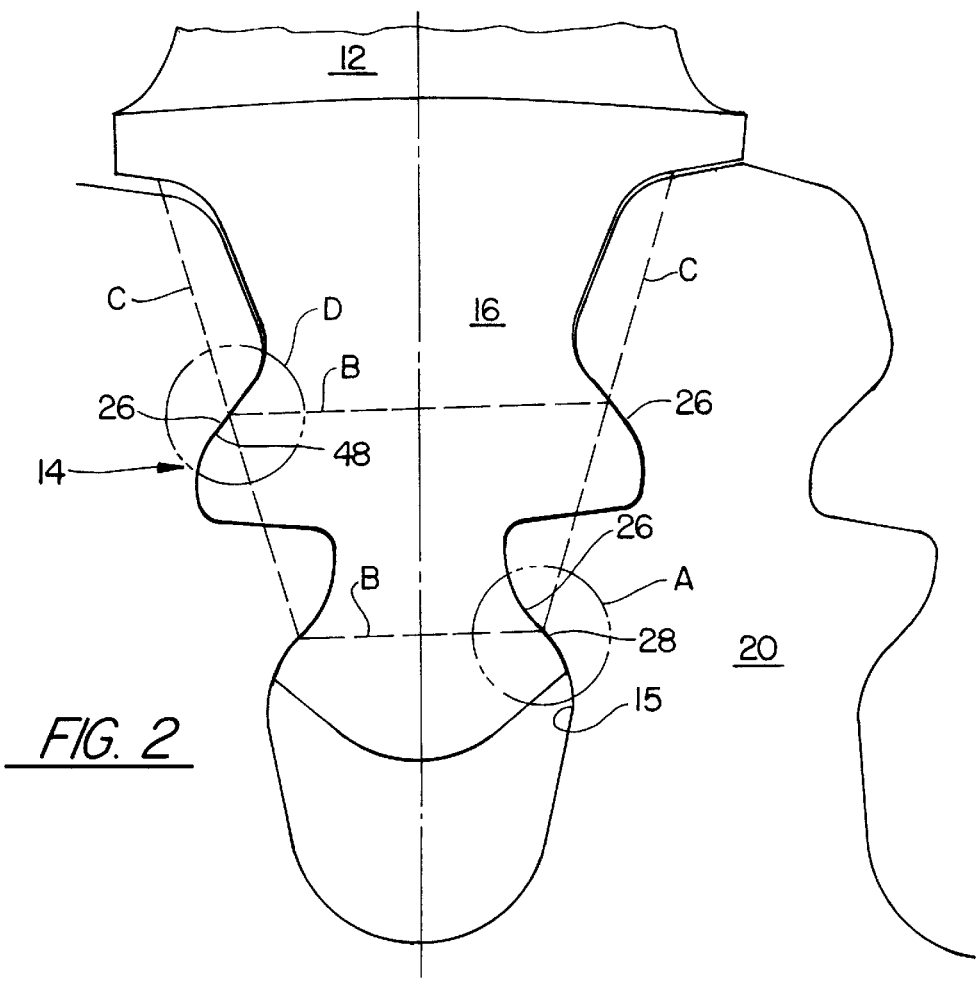
FIG. 2 is a fragmentary view in elevation illustrating the broach slot in the disk and the firtree root configuration of the blade and the attachment thereof.
Figure 3:
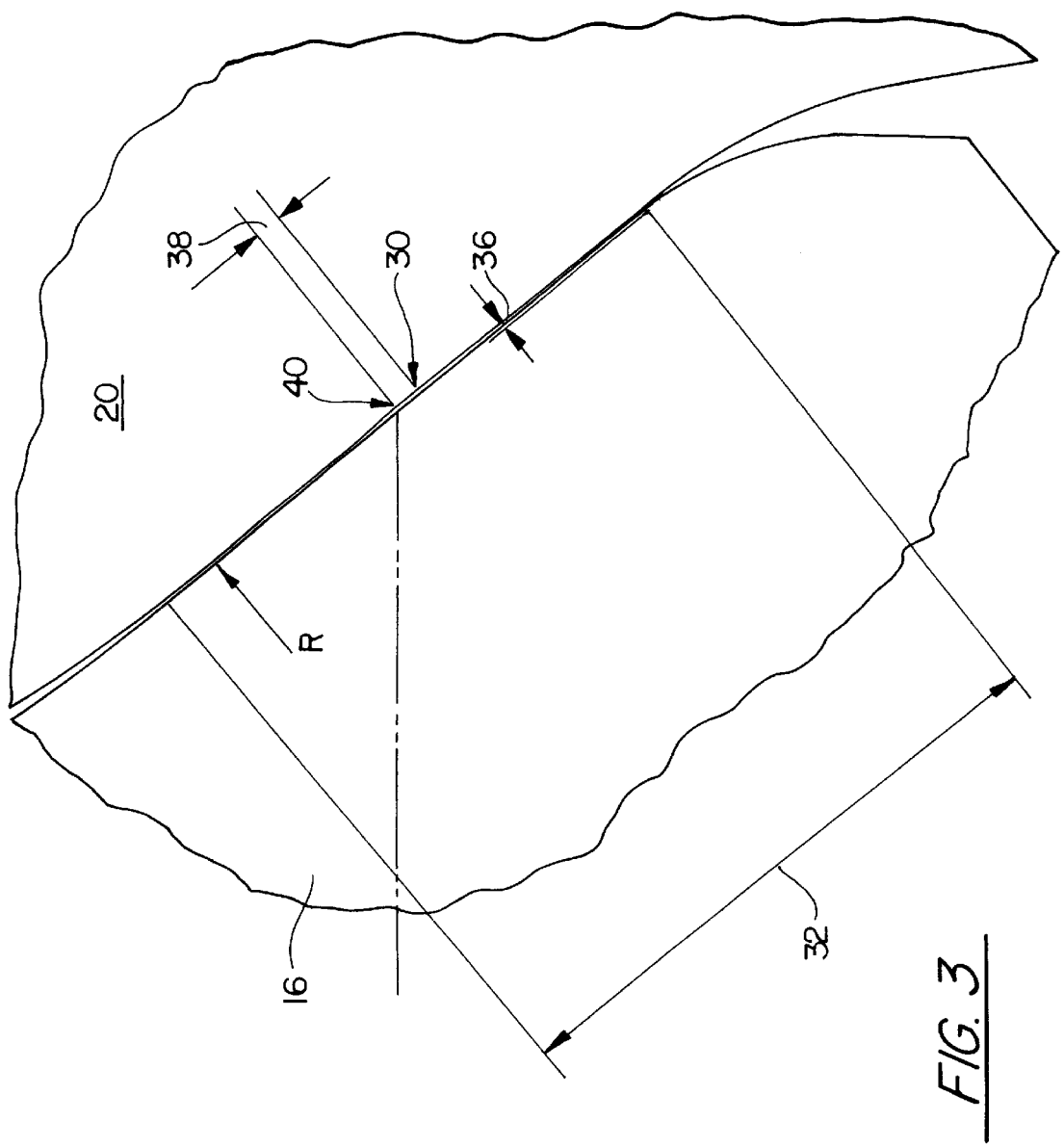
FIG. 3 is an enlarged view of the bearing surfaces under the circle A of FIG. 2 illustrating the details of the invention.

Next referring to FIGS. 2 and 3 which illustrates the details of this invention. As noted in FIG. 2 the enlarged view of the firtree attachment 14 illustrates the bearing surfaces 26 of the firtree attachment. The horizontal dash lines B are superimposed on the blade to indicate the "Z" plane which, as one skilled in this art knows is the plane that is utilized as a base line for establishing the dimensions of the blade. The angled dash lines C are superimposed to illustrate the orientation line for the center of the bearing surfaces. Since all the bearing surfaces can be made to include the teachings of this invention, only one bearing surface will be selected to describe the details of this invention and that bearing surface is the one that is under the dashed circle A. As can best be seen in FIG. 2 the center 28 of the bearing surface 26 is at the point where the vertical dash line C and horizontal dash line B intersect under the dashed circle A. As was mentioned in the above paragraphs the heretofore known firtree attachment incurred a high stress and this high stress was particularly noticeable at the edges of the bearing surface. These heretofore known bearing surfaces were flat, i.e. the face of the bearing surface is flat. In FIGS. 2 and 3 the inside diameter (ID) tooth bearing surface 26 of the blade firtree depicted under the dash circle A is modified in accordance with this invention by contouring the surface to be slight "crowned" at a predetermined radius R. Obviously, the contact at the interface of the bearing surface is initially made at the center 28 (as viewed in FIG. 3, the line contact is in and out of the plane of the drawing). As the rotational speed of the rotor increases, and the firtree and broach deforms under the load imposed by the rotation and contact with the engine's working medium, the area of contact widens to the area depicted by the dimension labeled 32 between the adjacent fillet radii 39 and 40 of the blade firtree. The selection of radius R will be determined by well known analysis so that the bearing area will spread out over the desired width indicated by the distance of the dimension 32 when the rotor sees the maximum load.

In accordance with this invention, the width of the bearing surface 26 can be increased over the conventional attachment due to the gap 36 that is occasioned by crowning the bearing surface. This will occur in the unloaded condition. In order to increase the width of the bearing surface the initial contact point 26 is moved a predetermined distance indicated by dimension 38 from the nominal center 28 that would otherwise be in the conventional flat bearing surface. The slight movement of the initial contact point from 28 to 30 will increase the bearing area by substantially twice the distance indicated by dimension 38. The consequence of this change will result in a smaller attachment for the same load carrying ability that is reflected in the weight of the rotor and the overall improvement in the engine's performance.

Similarly to the crowning of the tooth bearing surface 26 of the blade firtree as depicted in FIGS. 2 and 3 the bearing surface 42 of the wall defining the broached slot 16 depicted under the dashed circles is modified in accordance with this invention by contouring the surface to be slight "crowned" at a predetermined radius R. Obviously, the contact at the interface of the bearing surface is initially made at the center 44 (as viewed in FIG. 5, the line contact is in and out of the plane of the drawing). As the rotational speed of the rotor increases, and the firtree and broach deforms under the load imposed by the rotation and contact with the engine's working medium, the area of contact widens to the area depicted by the dimension labeled 46 between the adjacent fillet radii 51 and 53 of the blade firtree. The selection of radius R will be determined by well known analysis so that the bearing area will spread out over the desired width indicated by the distance of the dimension 46 when the rotor sees the maximum load.

In accordance with this invention, and similar to the embodiment depicted in FIG. 3, the width of the bearing surface 48 of the firtree can be increase over the conventional attachment due to the gap 50 that is occasioned by crowning the bearing surface. This will occur in the unloaded condition. In order to increase the width of the bearing surface the initial contact point 44 is moved a predetermined distance indicated by the dimension shown by line 52 from the nominal center 44 (that would otherwise be in the conventional flat bearing surface to the new contact point 58). The slight movement of the initial contact point 44 will increase the bearing area by substantially twice the distance indicated by dimension 52.

While this invention describes the crowning be selecting a given radius R for the bearing surface, the same effect can be achieved and considered to be within the scope of this invention, by providing a series of flat surfaces along the width of the bearing to approximate the curvature obtained by the radius R or it may likewise be accomplished by the combination of flat segments and radii.

Figure 4:
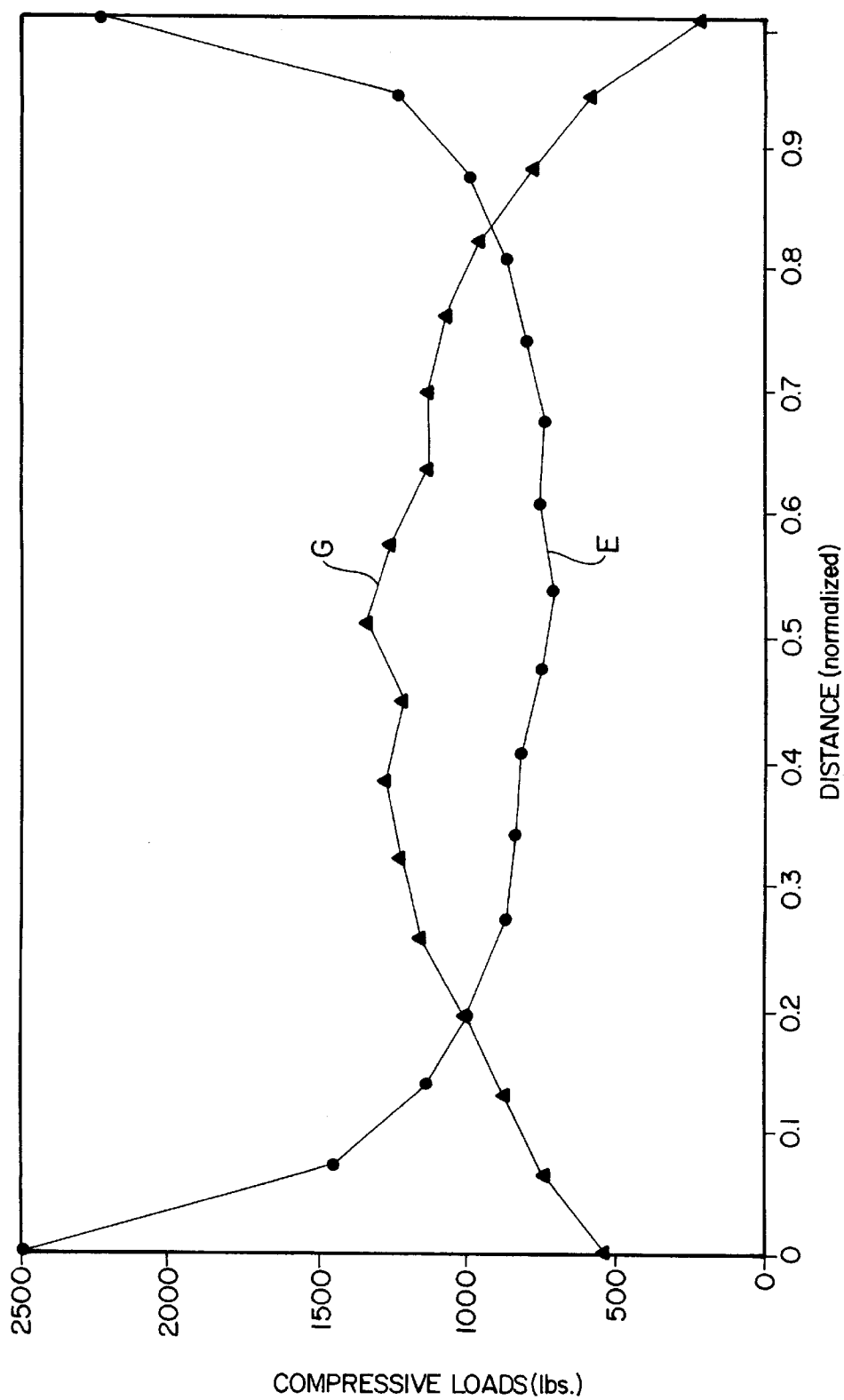
FIG. 4 is a graph of compressive loads vs. normalized distance of the bearing surface illustrating the comparison between the heretofore known attachment and the present invention.

FIG. 4 is a graph illustrating a comparison of the present invention and the heretofore known firtree attachments. The graph is a plot of compressive load in pounds and the normalized distance vs curve E represents the conventional flat bearing surfaces and curve G represents the crowned bearing surfaces and each curve shows the variation of contact pressure distribution load along the distance 32 of FIG. 3. It is apparent from viewing the curves E and G the compressive loads at the edges of the bearing surface is greatly reduced as a result of crowning the bearing surface and a more uniform load distribution over the entire width is realized. Since elastic distortion of the surfaces occurs in spreading out the bearing area, a spring rate is introduced that can be approximated by the final load carried by the surface divided by the amount of crowning indicated by the gap 36 in FIG. 3.

By crowning all of the teeth of the firtree, this spring rate will minimize the load share variation between individual teeth caused by the tolerance between individual bearing surfaces. Because the contact force at the edge of the bearing surface is reduced, the concentrated stress in the adjacent fillet surface (the usual life limiting point in a firtree) will be reduced with a consequential direct benefit in the longevity of the rotor.

One of the advantage of the teachings of this invention is that with the conventional flat bearing surfaces, the tolerances may cause initial contact at one side of the bearing surface or the other, with a resulting gap at the opposite end. If the initial contact occurs at the blade fillet end, the blade life will be reduced; while initial contact at the disk fillet end will reduce disk attachment life. This will cause more spread in the Life Data. It follows, therefore, that an experience based Life Prediction System based on the crowned attachment teeth of this invention would permit higher design allowable and result in lighter firtree designs for the same life expectancy.

Figure 5:
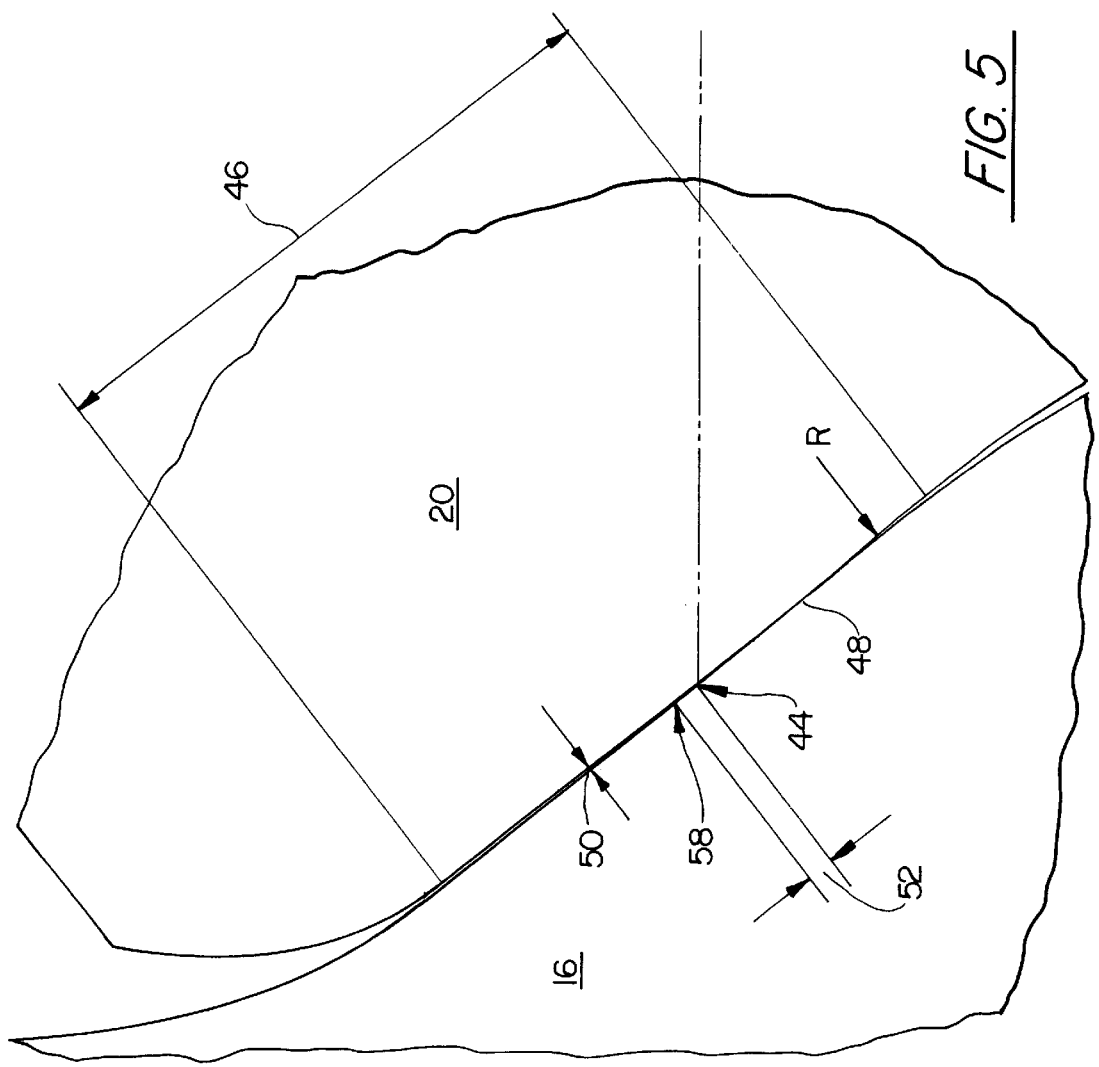
FIG. 5 is an enlarged view of the bearing surfaces under the circle D of FIG. 2 illustrating the details of the invention These figures merely serve to further clarify and illustrate the present invention and are not intended to limit the scope thereof.

In accordance with this invention and within the scope thereof, the crown could be provided on either the blade firtree as shown in FIG. 3, disk broach as shown in FIG. 5 or both. The designer is capable of selecting any or all of the bearing surfaces and contouring them with a crown in order to minimize the stresses as discussed above as well as moving the contact center in order to increase the dimension of the bearing surface so as to distribute the load over a wider area and attain a smaller attachment and enhancing engine performance. While the preferred configuration as disclosed in FIG. 3 of this embodiment, the crown is placed on the blade due to manufacturing considerations. The broach tooling is more expensive and more susceptible to wear. Whereas, the blade firtree is usually ground using a diamond wheel to dress the grinding wheel with the shape of the firtree. Wear on this tool compared to the broaching tool is a minor problem and is usually determined by features of smaller radii at other locations.

Although this invention has been shown and described with respect to detailed embodiments thereof, it will be appreciated and understood by those skilled in the art that various changes in form and detail thereof may be made without departing from the spirit and scope of the claimed invention.

What is claimed is:

1. A blade attachment for a rotor having a blade firtree and a disk having a broached slot, a wall defining said broached slot, said blade firtree fitted into the broached slot of said broached slotted disk having at least one bearing surface bearing against said wall defining the broached slot of said disk and said bearing surface being contiguous with a portion of said wall when the rotor is rotating and exerting a centrifugal load on the blade attachment and said bearing surface being crowned so that said bearing surface is in line contact with said wall when said rotor is stationary whereby the stress at the edges of said bearing surface is reduced.

2. A blade attachment as claimed in claim 1 wherein the center of said crown is positioned to extend the amount of said bearing surface that is in contiguous with said wall whereby the load distribution of said bearing surface is extended over an increased dimension when said rotor is rotating.

3. A blade attachment for a rotor having a blade firtree and a disk having a broached slot, a wall having a bearing surface defining said broached slot, said blade firtree having a bearing surface fitted into the broached slot of said broached slotted disk and said bearing surface of said wall and said bearing surface of said bladed firtree being in contiguous relationship when the rotor is rotating and exerting a centrifugal load on the blade attachment and said bearing surface of said wall being crowned so that said bearing surface of said wall is in point contact with said bearing surface of the blade firtree when said rotor is stationary, whereby the stress at the ends of said bearing surface is reduced.

4. A blade attachment as claimed in claim 3 wherein the center of said crown is positioned to extend the amount of said bearing surface of said wall of said broached slot that is in contiguous with said bearing surface of said firtree whereby the load distribution of said bearing surface of said broached slot and said bearing surface of said firtree is extended over an increased dimension when said rotor is rotating.

5. A rotor for a gas turbine engine having a disk and a plurality of circumstantial spaced blades supported in said disk, each of said blades having a root section and an airfoil section, said root section being configured in a firtree, said disk having a slot complementing said firtree for defining an attachment for each of said blades to said disk, a wall defining said broached slot, said blade firtree having a bearing surface bearing against said wall and said bearing surface being contiguous with a portion of said wall when the rotor is rotating and exerting a centrifugal load on said attachment and said bearing surface being crowned defining a convex surface having an apex, so that said apex of said bearing surface is in line contact with said wall when said rotor is stationary whereby the stress at the edges of said bearing surface is reduced when said rotor is rotating.

6. A rotor having a disk and a plurality of circumstantially spaced blades supported in said disk as claimed in claim 5 wherein said blades are turbine blades.

7. A rotor having a disk and a plurality of circumstantial spaced blades supported in said disk as claimed in claim 6 wherein the center of said crown is positioned to extend the amount of said bearing surface that is in contiguous with said wall whereby the load distribution of said bearing surface is extended over an increased dimension when said rotor is rotating.

8. A rotor for a gas turbine engine having a disk and a plurality of circumstantial spaced blades supported in said disk, each of said blades having a root section and an airfoil section, said root section being configured in a firtree, said disk having a slot complementing said firtree for defining an attachment for each of said blades to said disk, a wall defining said broached slot, said wall having a bearing surface bearing against said firtree and said bearing surface being contiguous with a portion of said firtree when the rotor is rotating and exerting a centrifugal load on said attachment and said bearing surface being crowned defining a convex surface having an apex, so that said apex of said bearing surface is in line contact with said firtree when said rotor is stationary whereby the stress at the edges of said bearing surface is reduced when said rotor is rotating.

9. A rotor having a disk and a plurality of circumstantially spaced blades supported in said disk as claimed in claim 8 wherein said blades are turbine blades.

10. A rotor having a disk and a plurality of circumstantial spaced blades supported in said disk as claimed in claim 9 wherein the center of said crown is positioned to extend the amount of said bearing surface that is contiguous with said firtree whereby the load distribution of said bearing surface is extended over an increased dimension when said rotor is rotating.

11. The method of reducing the stresses of the edges of the bearing surface of each of the blade firtree bearing surfaces in the attachment in the broached slot of the disk of a rotor comprising the steps of crowning the firtree bearing surface so that there is a line contact at the center of the bearing surface when the rotor is stationary when assembled to the disk and that the bearing surface is contiguous with the wall of the broached slot of the disk when the rotor is rotating and fully loaded so that the load is transferred to the attachment.

12. The method of claim 11 including the step of positioning the center of crown from the nominal center to extend the amount of said bearing surface that is in contiguous with said wall whereby the load distribution of said bearing surface is extended over an increased dimension when said rotor is rotating.

13. The method of reducing the stresses of the edges of the bearing surface of each of the blade firtree bearing surfaces in the attachment in the broached slot of the disk of a rotor comprising the steps of crowning the wall defining the broached slot where the firtree fits into the broached slot bearing surface so that there is a point contact at the center of the bearing surface when the rotor is stationary when assembled to the disk and that the bearing surface is contiguous with the bearing surface of the firtree of the blade when the rotor is rotating and fully loaded so that the load is transferred to the disk.

14. The method of claim 13 including the step of positioning the center of crown from the nominal center to extend the amount of said bearing surface that is in contiguous with said wall whereby the load distribution of said bearing surface is extended over an increased dimension when said rotor is rotating.

15. The method of reducing the stresses at the edges of the bearing surfaces of the wall of the broached slotted disk and the firtree of the attached blade of a rotor including the steps of forming a plurality of blades with firtree attachments and broaching a plurality of slots in the disk and fitting the blades into the broached slots and crowning selected bearing surfaces of the firtree so as to reduce the stresses on the edges of the bearing surface and extend the load distribution on the bearing surface so as to reduce the size of the attachment and weight of the rotor and crowning selected bearing surfaces of the wall defining the bearing surface in the broached slot so as to reduce the stresses on the edges of the bearing surface.

16. The method of claim 15 including the step of positioning the center of crown from the nominal center to extend the amount of said bearing surface that is in contiguous with said wall whereby the load distribution of said bearing surface is extended over an increased dimension when said rotor is rotating.

* * * * *